(12) United States Patent
Piper et al.

(10) Patent No.: US 12,545,331 B2
(45) Date of Patent: Feb. 10, 2026

(54) ROOF STRENGTH MOMENT CANCELLING BULKHEAD (71) Applicant: Toyota Motor Engineering & Manufacturing North America, Inc., Plano, TX (US)

(72) Inventors: Peter C. J. Piper, Saline, MI (US); Chase A. Young, Ann Arbor, MI (US); Alex B. Taylor, Chelsea, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 375 days.

(21) Appl. No.: 18/219,030

(22) Filed: Jul. 6, 2023

(65) Prior Publication Data

US 2025/0010920 A1    Jan. 9, 2025

(51) Int. Cl.
*B62D 25/02* (2006.01)
*B62D 21/15* (2006.01)
*B62D 25/04* (2006.01)
*B62D 25/06* (2006.01)
*B62D 27/02* (2006.01)

(52) U.S. Cl.
CPC ............. *B62D 25/04* (2013.01); *B62D 21/15* (2013.01); *B62D 21/157* (2013.01); *B62D 25/06* (2013.01); *B62D 27/023* (2013.01)

(58) Field of Classification Search
CPC ........ B62D 25/04; B62D 25/02; B62D 25/06; B62D 27/023
USPC ......... 296/210, 23.01, 3, 29, 30.187, 12, 13, 296/193.06
See application file for complete search history.

(56) References Cited

U.S. PATENT DOCUMENTS

| | | | |
|---|---|---|---|
| 7,431,378 B2 | 10/2008 | Chen et al. | |
| 8,491,046 B2* | 7/2013 | Nagai | B62D 25/02 296/193.06 |
| 8,944,494 B2 | 2/2015 | Nakamura et al. | |
| 2012/0153676 A1* | 6/2012 | Shono | B62D 25/06 296/193.06 |
| 2018/0141591 A1* | 5/2018 | Urago | B62D 25/04 |

\* cited by examiner

*Primary Examiner* — Dennis H Pedder
(74) *Attorney, Agent, or Firm* — Snell & Wilmer LLP (57) ABSTRACT

A vehicle roof support structure on a vehicle. The vehicle roof support structure includes a roof rail member extending in a lengthwise direction of the vehicle. The vehicle roof support structure also includes a side pillar member disposed at least partially below the roof rail member on a lateral side of the vehicle and extending substantially in a vertical direction of the vehicle. The vehicle roof support structure further includes a load force transfer member. The load force transfer member includes a first portion connected to the side pillar member and a second portion spaced a predetermined distance away from a closest point on the roof rail member. The load force transfer member is configured to assume at least a portion of a load force applied on the roof rail member during a roof impact event.

20 Claims, 5 Drawing Sheets

ROOF STRENGTH MOMENT CANCELLING BULKHEAD

BACKGROUND

Field

The present disclosure relates to apparatuses and systems for providing a roof strength moment cancelling bulkhead.

Description of the Related Art

A roof rail on a vehicle (e.g., disposed, as part of a vehicle body, between a roof and a door frame) may contact a ground surface before a B pillar on the vehicle (i.e., a center pillar on a lateral side of the vehicle) does during a rollover event. However, the roof rail is conventionally much weaker than the B pillar. Thus, during such rollover event, it is desirable to transfer a load force from the roof rail to the B pillar as quickly as possible to prevent excessive deformation of the roof rail (which may cause direct impact on occupant(s) that may be present within the vehicle during the rollover event). It is typically difficult to improve joint strength and/or load force transfer capability by welding the B pillar to the roof rail at a junction between these parts. Moreover, other conventional measures to improve the load force transfer to supporting Body in White (BIW) members, such as modifying reinforcement panel gauge and/or panel material specifications (e.g., for yield strength improvement), incur increases in vehicle mass and/or production cost.

Hence, there is a need for improved apparatuses and systems for transferring a load force applied on a roof rail on a vehicle to other BIW members such as a B pillar.

SUMMARY

Described herein is a vehicle roof support structure on a vehicle. The vehicle roof support structure may include a roof rail member. The roof rail member may extend in a lengthwise direction of the vehicle. The vehicle roof support structure may include a side pillar member. The side pillar member may be disposed at least partially below the roof rail member on a lateral side of the vehicle. The side pillar member may extend substantially in a vertical direction of the vehicle. The vehicle roof support structure may include a load force transfer member. The load force transfer member may include a first portion connected to the side pillar member. The load force transfer member may include a second portion spaced a predetermined distance away from a closest point on the roof rail member. The load force transfer member may be configured to assume at least a portion of a load force applied on the roof rail member during a roof impact event. At least the portion of the load force assumed by the load force transfer member may be transferred, at least in part, to the side pillar member.

Also described is a vehicle body on a vehicle. The vehicle body may include a roof rail member. The roof rail member may extend in a lengthwise direction of the vehicle. The vehicle body may include a side pillar member. The side pillar member may be disposed at least partially below the roof rail member on a lateral side of the vehicle. The side pillar member may extend substantially in a vertical direction of the vehicle. The vehicle body may include a load force transfer member. The load force transfer member may include a first portion connected to the side pillar member. The load force transfer member may include a second portion spaced a predetermined distance away from a closest point on the roof rail member. The load force transfer member may be configured to assume at least a portion of a load force applied on the roof rail member during a roof impact event. At least the portion of the load force assumed by the load force transfer member may be transferred, at least in part, to the side pillar member.

Moreover, also described is a vehicle having a vehicle roof support structure. The vehicle roof support structure may include a roof rail member. The roof rail member may extend in a lengthwise direction of the vehicle. The vehicle roof support structure may include a side pillar member. The side pillar member may be disposed at least partially below the roof rail member on a lateral side of the vehicle. The side pillar member may extend substantially in a vertical direction of the vehicle. The vehicle roof support structure may include a load force transfer member. The load force transfer member may include a first portion connected to the side pillar member. The load force transfer member may include a second portion spaced a predetermined distance away from a closest point on the roof rail member. The load force transfer member may be configured to assume at least a portion of a load force applied on the roof rail member during a roof impact event. At least the portion of the load force assumed by the load force transfer member may be transferred, at least in part, to the side pillar member.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes apparatuses and systems for providing a roof strength moment cancelling bulkhead (also referred to herein as a tab structure, a bracket, and/or a load force transfer member). These apparatuses and systems provide many benefits and advantages including improving load force transfer capability from a roof rail on a vehicle to a center roof bow or a B pillar (also referred to herein as a side pillar member) during a vehicle rollover or a roof strength evaluation.

The apparatuses and systems described herein (i.e., those including the load force transfer member) relies on a strategic structure planning and increases roof rail to B pillar interaction in an effort to achieve an improvement in load force transfer from the roof rail to Body in White (BIW) members on a vehicle without modification to, e.g., reinforcement panel gauge or material specifications.

The apparatuses and systems described herein provide an addition of a tab structure or a bracket extending above an existing bulkhead or patch within a B pillar. The existing bulkhead or patch without the added tab structure or bracket may provide support to prevent a section collapse and/or reinforce an inner B pillar portion where an upper seat belt attachment may be (i.e., without the increased roof rail to B pillar interaction described herein). The added tab structure promotes an earlier interaction between a roof rail reinforcement and a B pillar structure (i.e., earlier than without the tab structure added), thus increasing structure stiffness and peak load achievement with respect to, e.g., the B pillar structure.

Figure 1A:
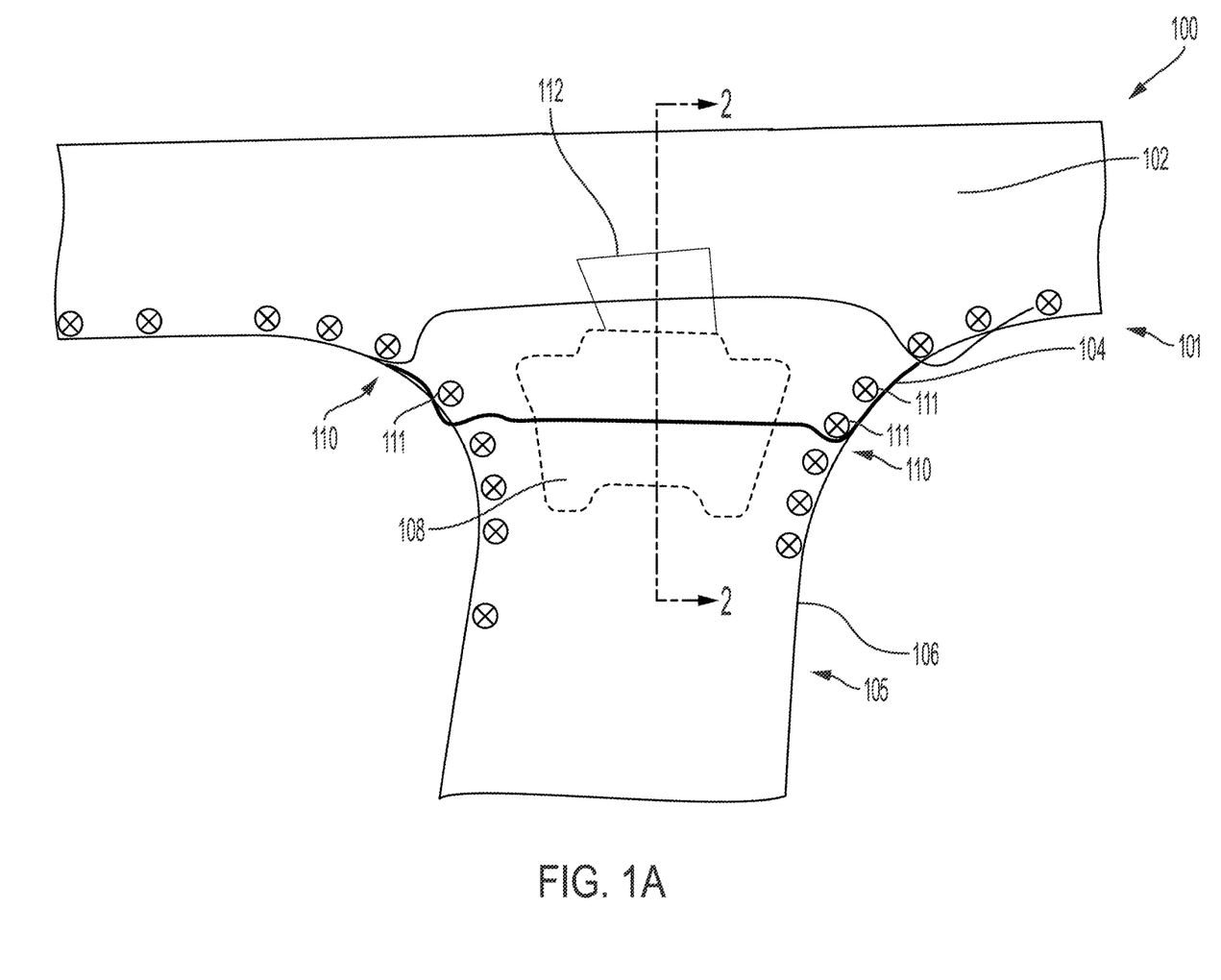
FIG. 1A is an illustration of a side view of a vehicle roof support structure according to an embodiment of the present invention.

Turning to FIG. 1A, a vehicle roof support structure 100 is shown. FIG. 1A is an illustration of a side view of the vehicle roof support structure 100. The vehicle roof support structure 100 may be part of a vehicle (e.g., a vehicle body on the vehicle). The vehicle may have an automatic transmission or a manual transmission. The vehicle may be a self-propelled wheeled conveyance, such as a car, a sport utility vehicle (SUV), a truck, a bus, a van, or other motor or generator driven vehicle. For example, the vehicle may be an electric vehicle, a hybrid vehicle, a plug-in hybrid vehicle, a fuel cell vehicle, or any other type of vehicle that includes a motor/generator.

As shown, the vehicle roof support structure 100 includes a load force transfer member 112. The vehicle roof support structure 100 may also include a roof rail member 101 including an outer roof rail portion 102 and an inner roof rail portion 104, a side pillar member 105 including at least an inner side pillar portion 106, and a bulkhead 108 (also referred to herein as a patch).

The roof rail member 101 may be disposed between a roof and a door frame on a vehicle. The roof rail member 101 on each lateral side of the roof (i.e., just above the door frame) may extend in a lengthwise direction of the vehicle. That is, the roof rail member 101 may run from a front end of the roof on each lateral side of the roof (i.e., towards a front end of the vehicle) to a rear end of the roof on each lateral side of the roof (i.e., towards a rear end of the vehicle).

The inner roof rail portion 104 may be connected (e.g., attached) to the inner side pillar portion 106. As but one example, the inner roof rail portion 104 may be welded (e.g., spot-welded) to the inner side pillar portion 106, e.g., at connecting portions 110 (including welding spots 111). The outer roof rail portion 102 may be spaced away from the inner side pillar portion 106 or the load force transfer member 112 (e.g., by at least a predetermined distance) as described further herein. For example, the closest distance between the outer roof rail portion 102 and the inner side pillar portion 106 or the load force transfer member 112 may be at least the predetermined distance. The outer roof rail portion 102 may be disposed radially outward from the inner roof rail portion 104.

The side pillar member 105 including at least the inner side pillar portion 106 may be a B pillar on the vehicle, providing support for a vehicle roof. That is, the side pillar member 105 may be located, e.g., between a front door window and a rear door window on each lateral side of the vehicle. In some embodiments, it would be apparent to one of ordinary skill in the art that the side pillar member 105 may be a different pillar on the vehicle such as, e.g., an A, C, or D pillar on the vehicle without departing from the spirit of the present disclosure. The side pillar member 105 may be attached to the roof rail member 101 at the connecting portions 110 and disposed, at least partially below the roof rail member 101 (i.e., closer to a ground surface when the vehicle is disposed in an upright position). The side pillar member 105 may extend substantially in a vertical direction (i.e., from the vehicle roof to the ground surface when the vehicle is disposed in an upright position).

The bulkhead 108 may be a structure attached to the side pillar member 105 and providing support to prevent a section collapse in its vicinity (i.e., a collapse of one or more parts connected to or within a predetermined distance from the bulkhead 108) and/or reinforcement to the inner side pillar portion 106 (e.g., where an upper seat belt attachment may be).

The load force transfer member 112 may be connected to the inner roof rail portion 104 and the bulkhead 108. For example, a first portion of the load force transfer member 112 may be attached to the inner roof rail portion 104 (e.g., at the junction of the inner roof rail portion 104 and the inner side pillar portion 106), and a second portion of the load force transfer member 112 may be attached to the bulkhead 108. The attachment of the inner roof rail portion 104 and the inner side pillar portion 106 allows at least a portion of a load force applied on the roof rail member 101 (e.g., the inner roof rail portion 104) to be transferred to and assumed by the inner side pillar portion 106.

In the event of an impact on a roof on a vehicle (e.g., during a vehicle rollover or a vehicle roof evaluation performed by an organization such as, e.g., Insurance Institute for Highway Safety (IIHS)), at least some of the force from the impact on the roof may be received by the roof rail member 101. While the roof rail member 101 may be displaced (i.e., deformed) to a certain degree due the impact on the roof on the vehicle, the vehicle may be designed such that the load force on the roof rail member 101, at least in part, is transferred to the side pillar member 105 (which is conventionally stronger than the roof rail member 101) as quickly as possible-when the roof rail member 101 is deformed such that it contacts the load force transfer member 112, allowing the load force received by each of the outer roof rail portion 102 and the inner roof rail portion 104 to be transferred, at least in part, to the load force transfer member 112 and on to the side pillar member 105 including at least the inner side pillar portion 106 (i.e., earlier than without the load force transfer member 112). The load force transfer (which may occur as the vehicle roof or the roof rail member 101 is displaced or deformed to contact the load force transfer member 112) allows the vehicle roof or the roof rail member 101 to provide a prescribed level of stiffness to prevent excessive displacement or deformation of the vehicle roof or the roof rail member 101 to protect occupant (s) who may be present in the vehicle during the rollover event (which may be simulated during the roof strength evaluation). This may also allow the amount of load force transferred to and assumed by other pillar member(s) (e.g., A, C, and/or D pillars) to be substantially in sync—that is, distributed to the respective pillar members of the A, B, C, and/or D pillars such that, e.g., the potential impact to any occupant in the vehicle may be minimized. The load force transfer member 112 may provide support to the vehicle roof or the roof rail member 101 such that a prescribed level of load force is supported, e.g., for a predetermined period of time or before a predetermined level of displacement occurs for a platen applying force on the roof rail member 101 during a roof evaluation event (e.g., in accordance with the IIHS requirement(s)).

Figure 1B:
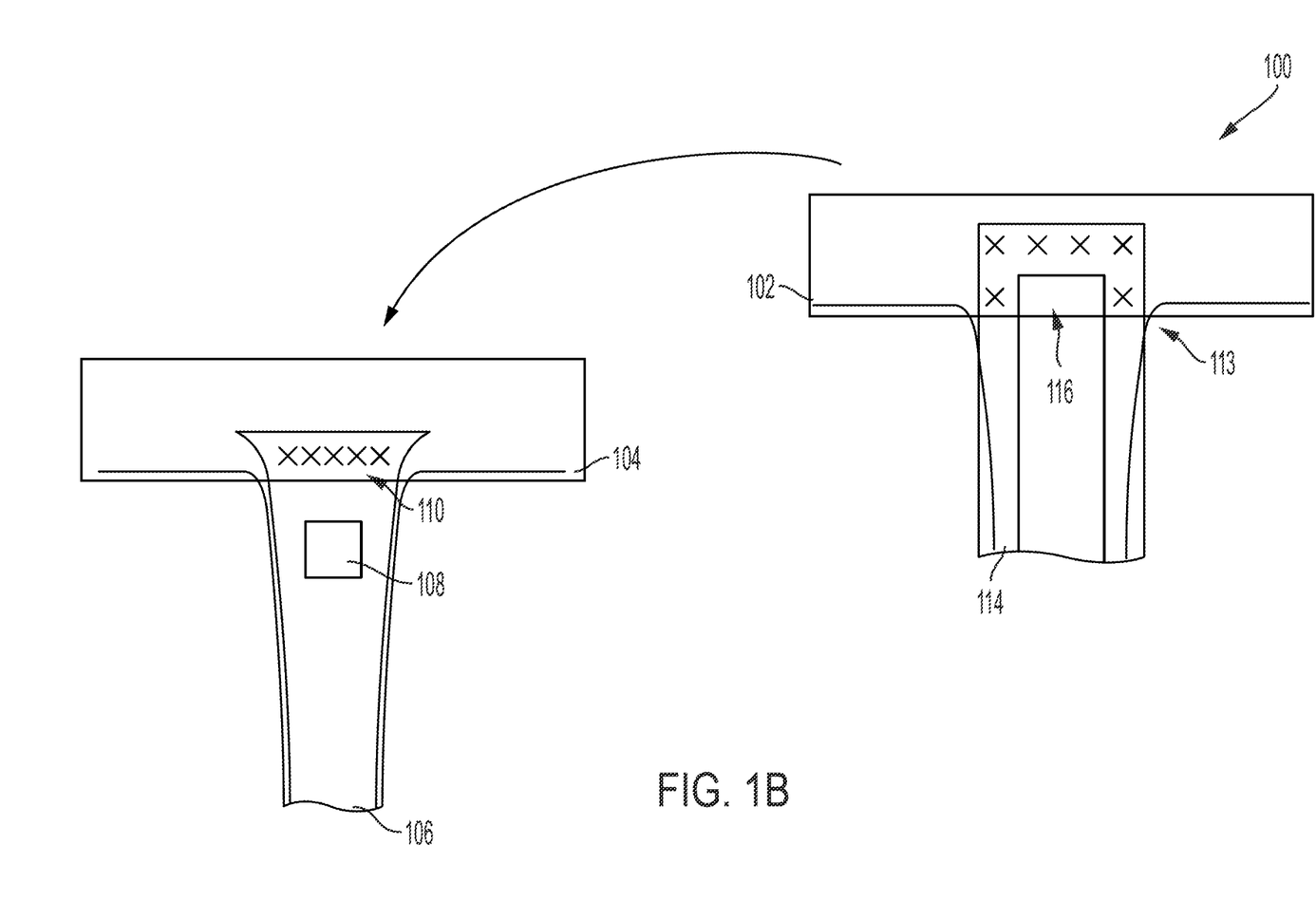
FIG. 1B is an illustration of an exploded view of a portion of a vehicle roof support structure according to an embodiment of the present invention.

FIG. 1B is an illustration of an exploded view of a portion of the vehicle roof support structure 100. As shown, the inner roof rail portion 104 may be connected to the inner side pillar portion 106 (including the bulkhead 108 attached thereon) at the connecting portions 110. The outer roof rail portion 102 may be connected to an outer side pillar portion 114 (disposed radially outward from the inner side pillar portion 106) at connecting portions 113. There may be a gap or space 116 between the outer roof rail portion 102 and the inner side pillar portion 106 (e.g., the connecting portions 110 of the inner roof rail portion 104 and the inner side pillar portion 106). The space 116 may be of a predetermined distance (e.g., as determined by a manufacturer of the vehicle). The predetermined distance of the space 116 between the outer roof rail portion 102 and the inner side pillar portion 106 may be determined by the manufacturer of the vehicle to (i) prevent a contact between the outer roof rail portion 102 and the load force transfer member 112 (or any other component such as the inner side pillar portion 106) while the vehicle is being driven (potentially generating unwanted noise or damage from such contact being made) and (ii) enable at least the portion of the load force to be assumed by the load force transfer member 112 during the roof impact event before a threshold amount of displacement occurs, e.g., on the roof rail member 101. The load force transfer member 112 discussed with respect to FIG. 1A may be connected to the bulkhead 108 so as to achieve the early interaction between the roof rail member 101 and the side pillar member 105 (e.g., the inner side pillar portion 106) described herein.

Figure 2:
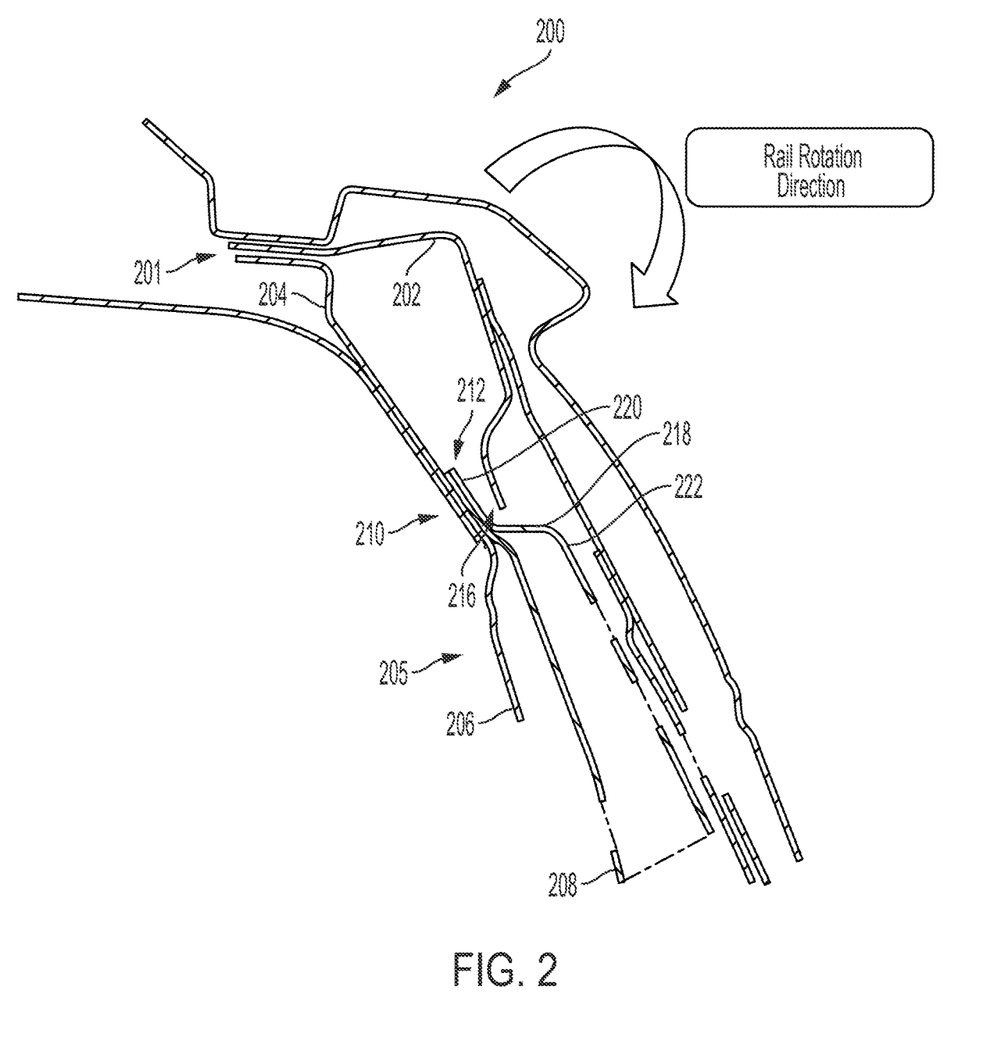
FIG. 2 is an illustration of a cross-sectional view of a vehicle roof support structure according to an embodiment of the present invention.

FIG. 2 is an illustration of a cross-sectional view (of the 2-2 plane shown in FIG. 1A) of a vehicle roof support structure 200 (similar to the vehicle roof support structure 100 shown in and described herein with respect to FIGS. 1A and/or 1B). As shown, the vehicle roof support structure 200 includes a load force transfer member 212 (similar to the load force transfer member 112 shown in and described herein with respect to FIGS. 1A and/or 1B). The vehicle roof support structure 200 may also include a roof rail member 201 (similar to the roof rail member 101 shown in and described herein with respect to FIGS. 1A and/or 1B) including an outer roof rail portion 202 (similar to the outer roof rail portion 102 shown in and described herein with respect to FIGS. 1A and/or 1B) and an inner roof rail portion 204 (similar to the inner roof rail portion 104 shown in and described herein with respect to FIGS. 1A and/or 1B), a side pillar member 205 (similar to the side pillar member 105 shown in and described herein with respect to FIGS. 1A and/or 1B) including at least an inner side pillar portion 206 (similar to the inner side pillar portion 106 shown in and described herein with respect to FIGS. 1A and/or 1B), and a bulkhead 208 (similar to the bulkhead 108 shown in and described herein with respect to FIGS. 1A and/or 1B). The inner roof rail portion 204 and the inner side pillar portion 206 may be connected or attached (e.g., spot-welded) together at a connecting portion 210 (similar to the connecting portions 110 shown in and described herein with respect to FIGS. 1A and/or 1B). The outer roof rail portion 202 may be spaced away from the load force transfer member 212 with a gap or space 216 (similar to the gap or space 116 shown in and described herein with respect to FIG. 1B) in between.

If the space 216 is too small, there may be a risk for an unwanted noise or vibration from the load force transfer member 212 potentially contacting the outer roof rail member 202 while a vehicle may be moving. On the other hand, if the space 216 is too large, the transfer of load force from the outer roof rail portion 202 to the load force transfer member 212 and then on to the inner side pillar portion 206 may occur too late (i.e., after a predetermined amount of time expires or a predetermined amount of displacement occurs, e.g., on a platen applying force on the roof rail member 201 during a roof strength evaluation event). That is, less than a desired amount of load force may be transferred to the inner side pillar portion 206—instead, more than a desired amount of load force may be received or assumed by the roof rail member 201, potentially causing the vehicle roof to be displaced more than desired and/or impacting occupant(s) in the vehicle. The size of the space 216 (e.g., a closest distance between the outer roof rail portion 202 and the load force transfer member 212) may be predetermined or predefined—e.g., by a manufacturer of the vehicle or the like. The predetermined size of the space 216 may be a specific value or a specific range of values.

As an aside, a roof strength evaluation or test may include a test platen being placed near a roof rail between A pillar and B pillar on a vehicle. As part of the roof strength evaluation or test, the test platen near the roof rail between the A pillar and the B pillar on the vehicle may contact the roof rail with a prescribed amount of force. For example, IIHS Roof Strength Test Protocol includes the roof of a vehicle being crushed by a test platen at a predetermined angle to a minimum displacement of 127 millimeters (mm) at a nominal rate of 5 mm/second. The maximum amount of action/reaction force observed (e.g., as measured by one or more sensors connected to the test platen) prior to the 127 mm of platen displacement may be used to obtain strength-to-weight ratio (SWR) data (i.e., obtained by dividing the observed amount of force by the curb weight of the vehicle measured with full fluid levels).

Referring back to FIG. 2, during a roof impact event on a vehicle such as a vehicle rollover (which may be simulated by, e.g., the foregoing roof strength evaluation or test), the load force transfer member 212 may be configured or designed to support a load force of at least a predetermined level before a threshold amount of displacement occurs on the roof rail member 201 (e.g., after the contact between the roof rail member 201 and the load force transfer member 212)—which may be equivalent or correspond to a threshold amount of displacement of the test platen during a roof strength evaluation or test (e.g., 127 mm at the time of the present disclosure).

As another example, during a roof impact event, the load force transfer member 212 may be configured to support a load force of at least a predetermined level for at least a threshold amount of time (e.g., after the contact between the roof rail member 201 and the load force transfer member 212 or the contact on the roof rail member 201 from the roof impact event)—the threshold amount of time indicating the time it may take for the threshold amount of displacement (e.g., 127 mm) to occur on the roof rail member 201 (or, in the case of a roof strength evaluation or test, on a test platen).

Figure 4:
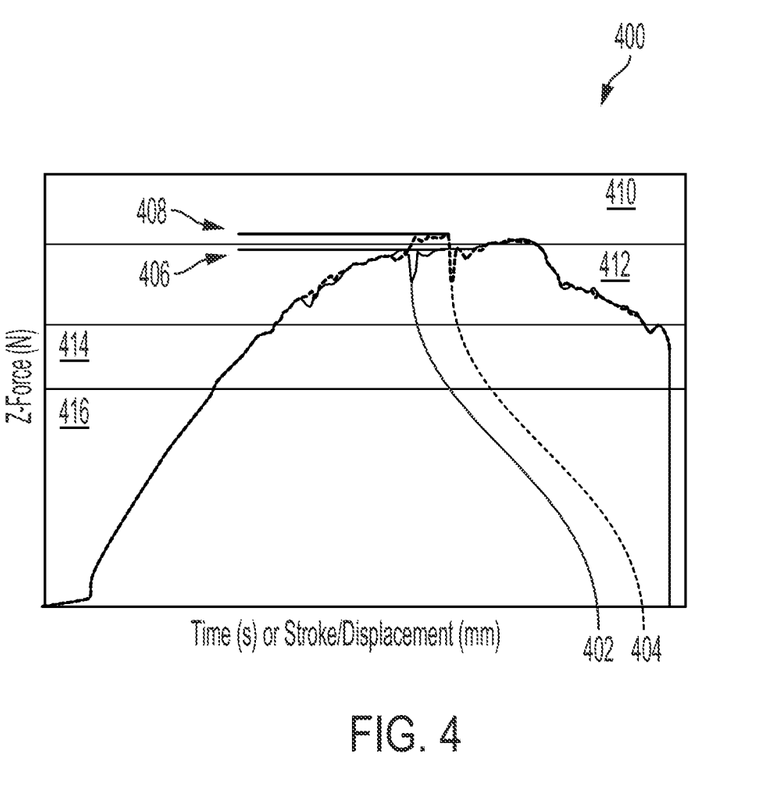
FIG. 4 is a graphical representation of reaction force related data compared to time or displacement of a roof rail or a test platen for a vehicle having a vehicle roof support structure according to an embodiment of the present invention.

Referring to FIG. 4, which is a graphical representation (a graph 400) of a relationship between a reaction force from a vehicle versus time or displacement of a roof rail member (or a test platen in the case of a roof strength evaluation or test described herein), the amount of force reacting to a load force (shown on the vertical axis of the graph 400) may increase with the time, the stroke, or the displacement (shown on the horizontal axis of the graph 400). The increasing amount of reaction force indicates an increasing amount of force the roof (i.e., the roof rail member) may be withstanding.

Referring back to FIG. 2, the load force transfer member 212 may include a first portion 220 and a second portion 222 with a connecting portion 218 disposed between the first portion 220 and the second portion 222. The first portion 220 may be attached to the inner roof rail portion 204 (e.g., at the junction of the inner roof rail portion 204 and the inner side pillar portion 206—the inner side pillar portion 206 being disposed, at least in part, below the roof rail member 201), and the second portion 222 may be attached to the bulkhead 208. The attachment of the first portion 220 of the load force transfer member 212 to the junction of the inner roof rail portion 204 and the inner side pillar portion 206 (i.e., the connecting portion 210) can allow the load force transfer from the outer roof rail portion 202 to the load force transfer member 212 (i.e., upon contact between the outer roof rail portion 202 and the load force transfer member 212 as the outer roof rail portion 202 is crushed towards the load force transfer member 212 during a roof impact event) and on to the inner side pillar portion 206 to be substantially in sync with the load force transfer from the inner roof rail portion 204 to the inner side pillar portion 206 (i.e., resulting in matched stiffness). The connecting portion 218 connects the first portion 220 and the second portion 222 together (meeting the first portion 220 and the second portion 222 at respective prescribed angles), and may be spaced away from the outer roof rail portion 202 by a known amount as described herein. As shown, the first portion 220, the second portion 222, and the connecting portion 218 may form a stepped structure. It would be apparent to one of ordinary skill in the art that the exact dimensions of each portion (including, e.g., an angle between two connected portions or parts) may vary as long as the space 216 is of the desired size and shape or orientation as described herein. Moreover, the material and/or the thickness of the load force transfer member 212 (and thus its strength) may be varied based on a plurality of factors including one or more manufacturer-specific requirements.

Figure 3:
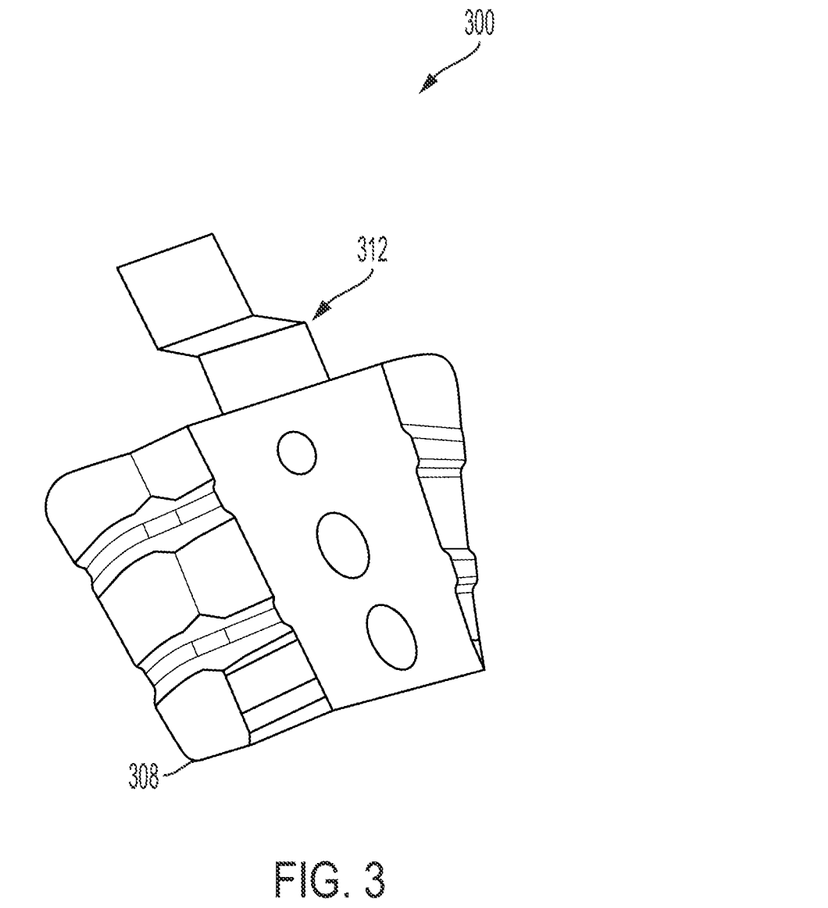
FIG. 3 is an illustration of a perspective view of a portion of a vehicle roof support structure according to an embodiment of the present invention.

FIG. 3 is an illustration of a perspective view of a portion of a vehicle roof support structure 300 (similar to the vehicle roof support structure 100 shown in and described herein with respect to FIGS. 1A and/or 1B and/or the vehicle roof support structure 200 shown in and described herein with respect to FIG. 2). As shown, the vehicle roof support structure 300 may include a load force transfer member 312 attached to a bulkhead 308, forming an extended bulkhead, the load force transfer member 312 being a bracket extending from the bulkhead 308.

Referring again to FIG. 4, the graph 400 shows a first curve 402 and a second curve 404. The first curve 402 indicates the relationship between the reaction force observed from the roof of a vehicle and the time or the stroke or the displacement of a test platen or a roof rail as measured without a load force transfer member (e.g., similar to the load force transfer member 112 or 212 described herein) installed on the vehicle. The second curve 404 indicates the relationship between the reaction force and the time or the stroke or the displacement of the test platen or the roof rail as measured with the load force transfer member installed on the vehicle. Moreover, the graph 400 shows a first region 410, a second region 412, a third region 414, and a fourth region 416. The regions 410, 412, 414, and 416 indicate different levels of load force a roof may withstand, in a decreasing order—the first region 410 indicating the highest amount of force being withstood, and the fourth region 416 indicating the lowest amount of force being withstood. For example, in the context of the IIHS Roof Strength Test Protocol discussed herein, the regions 410, 412, 414, and 416 may correspond, respectively, to the SWR values being "good," "acceptable," "marginal," and "poor." The graph 400 shows a first maximum reaction force level 406 (barely touching the first region 410) observed for the first curve 402 at a predetermined level of roof rail or test platen displacement (e.g., at or near 127 mm) and a second maximum reaction force level 408 (being well into the first region 410) observed for the second curve 404 at the predetermined level of roof rail displacement. As shown, the second maximum reaction force level 408 was higher than the first maximum reaction force level 406 for this observation-indicating an improvement due to the earlier load transfer with the load force transfer member being installed.

Where used throughout the specification and the claims, "at least one of A or B" includes "A" only, "B" only, or "A and B." Exemplary embodiments of the apparatuses, the systems, and the methods described herein have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments (e.g., including a singular element where multiple elements are described and/or multiple elements where a singular element is described, etc.) that reasonably fall within the scope of the advancement to the art hereby contributed, and that that scope shall not be restricted, except in light of the appended claims and their equivalents.

What is claimed is:

1. A vehicle roof support structure on a vehicle, comprising:
   a roof rail member extending in a lengthwise direction of the vehicle and including an outer roof rail portion having a free terminal end;
   a side pillar member disposed at least partially below the roof rail member on a lateral side of the vehicle and extending substantially in a vertical direction of the vehicle; and
   a load force transfer member including (i) a first portion connected to the side pillar member and disposed between the outer roof rail portion and the side pillar member, and (ii) a second portion spaced a predetermined distance away from a closest point on the roof rail member and disposed below the free terminal end, the load force transfer member being configured to assume at least a portion of a load force applied on the roof rail member during a roof impact event, at least the portion of the load force assumed by the load force transfer member being transferred, at least in part, to the side pillar member.

2. The vehicle roof support structure of claim 1, wherein the side pillar member is a B pillar on the vehicle.

3. The vehicle roof support structure of claim 1, wherein the roof impact event is a vehicle rollover event.

4. The vehicle roof support structure of claim 1, wherein the roof impact event is a vehicle roof evaluation event.

5. The vehicle roof support structure of claim 1, wherein the load force transfer member is configured to assume at least the portion of the load force applied on the roof rail member when the roof rail member is displaced to contact the load force transfer member during the roof impact event.

6. The vehicle roof support structure of claim 5, wherein the load force transfer member is configured to support the load force of at least a predetermined level before a threshold amount of displacement occurs on the roof rail member.

7. The vehicle roof support structure of claim 5, wherein the load force transfer member is configured to support the load force of at least a predetermined level for at least a threshold amount of time.

8. The vehicle roof support structure of claim 1, wherein the load force transfer member is configured such that its engagement with the roof rail member during the roof impact event promotes a coordinated deformation timing of the side pillar member relative to one or more other pillar members of the vehicle, thereby maintaining a substantially uniform displacement progression among the pillar members during the roof impact event.

9. The vehicle roof support structure of claim 1, wherein the roof rail member includes an inner roof rail portion and the outer roof rail portion is disposed radially outward from the inner roof rail portion, and the side pillar member includes an inner side pillar portion and an outer side pillar portion disposed radially outward from the inner side pillar portion;
wherein the inner roof rail portion is in contact with the inner side pillar portion, and the outer roof rail portion is spaced apart from the load force transfer member.

10. The vehicle roof support structure of claim 9, wherein the space between the outer roof rail portion and the load force transfer member is of a predetermined distance determined by a manufacturer of the vehicle to (i) prevent a contact between the outer roof rail portion and at least the load force transfer member while the vehicle is being driven and (ii) enable at least the portion of the load force to be assumed by the load force transfer member during the roof impact event before a threshold amount of displacement occurs on the roof rail member.

11. A vehicle body, comprising:
a roof rail member extending in a lengthwise direction of the vehicle body and including an outer roof rail portion having a free terminal end;
a side pillar member disposed at least partially below the roof rail member on a lateral side of the vehicle body and extending substantially in a vertical direction of the vehicle body; and
a load force transfer member including (i) a first portion connected to the side pillar member disposed between the outer roof rail portion and the side pillar member, and (ii) a second portion spaced a predetermined distance away from a closest point on the roof rail member and disposed below the free terminal end.

12. The vehicle body of claim 11, wherein the roof rail member includes an inner roof rail portion and the outer roof rail portion is disposed radially outward from the inner roof rail portion, and the side pillar member includes an inner side pillar portion and an outer side pillar portion disposed radially outward from the inner side pillar portion;
wherein the inner roof rail portion is in contact with the inner side pillar portion, and the outer roof rail portion is spaced apart from the load force transfer member.

13. The vehicle body of claim 11, wherein;
the closest point on the roof rail member is at the free terminal end; and
the load force transfer member being configured to assume at least a portion of a load force applied on the roof rail member during a roof impact event, at least the portion of the load force assumed by the load force transfer member being transferred, at least in part, to the side pillar member.

14. The vehicle body of claim 13, wherein the predetermined distance of the space between the outer roof rail portion and the load force transfer member is determined by a manufacturer of the vehicle body to (i) prevent a contact between the outer roof rail portion and at least the load force transfer member and (ii) enable at least the portion of the load force to be assumed by the load force transfer member during the roof impact event before a threshold amount of displacement occurs on the roof rail member.

15. The vehicle body of claim 11, wherein the load force transfer member further includes a connecting portion between the first portion and the second portion, wherein the first portion, the connecting portion, and the second portion form a stepped structure.

16. The vehicle body of claim 11, wherein the roof impact event is a vehicle rollover event.

17. The vehicle body of claim 11, wherein the roof impact event is a vehicle roof evaluation event.

18. The vehicle body of claim 17, wherein the load force transfer member is configured to assume at least the portion of the load force applied on the roof rail member when a platen contacts the roof rail member at a predetermined angle relative to a roof on the vehicle body in accordance with an IIHS (Insurance Institute for Highway Safety) requirement.

19. A vehicle having the vehicle body of claim 11.

20. The vehicle of claim 19, wherein the roof rail member includes an inner roof rail portion and the outer roof rail portion is disposed radially outward from the inner roof rail portion, and the side pillar member includes an inner side pillar portion and an outer side pillar portion disposed radially outward from the inner side pillar portion, wherein the inner roof rail portion is in contact with the inner side pillar portion, and the outer roof rail portion is spaced apart from the load force transfer member, wherein the space between the outer roof rail portion and the load force transfer member is of a predetermined distance determined by a manufacturer of the vehicle to (i) prevent a contact between the outer roof rail portion and at least the load force transfer member while the vehicle is being driven and (ii) enable at least the portion of the load force to be assumed by the load force transfer member during the roof impact event before a threshold amount of displacement occurs on the roof rail member.

* * * * *